United States Patent
Chen et al.

(10) Patent No.: US 8,432,491 B2
(45) Date of Patent: Apr. 30, 2013

(54) OBJECT-BASED SYSTEM AND METHOD OF DIRECTING VISUAL ATTENTION BY A SUBLIMINAL CUE

(75) Inventors: Homer H. Chen, Taipei (TW); Su-Ling Yeh, Taipei (TW); Tai-Hsiang Huang, Taipei (TW); Yung-Hao Yang, Taipei (TW); Hsin-I Liao, Taipei (TW); Ling-Hsiu Huang, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 78 days.

(21) Appl. No.: 13/220,533

(22) Filed: Aug. 29, 2011

(65) Prior Publication Data

US 2013/0050579 A1 Feb. 28, 2013

(51) Int. Cl.
*H04N 1/62* (2006.01)
(52) U.S. Cl.
USPC .......................................... 348/576; 348/571
(58) Field of Classification Search .................... 348/576
See application file for complete search history.

(56) References Cited

U.S. PATENT DOCUMENTS

2010/0146528 A1* 6/2010 Chen et al. ...................... 725/10
2011/0134316 A1* 6/2011 Oguchi et al. ................ 348/441

OTHER PUBLICATIONS

Nilson, Mikael et al., Face Detection Using Local SMQT Features and Split Up Snow Classifier, Apr. 20, 2007, pp. 1-4.*
Nilsson et al. "Face detection using local SMQT features and split up snow classifier" Proc. ICASSP, vol. 2, 2007, pp. 589-592.

* cited by examiner

*Primary Examiner* — Jefferey Harold
*Assistant Examiner* — Justin Sanders
(74) *Attorney, Agent, or Firm* — Stout, Uxa, Buyan & Mullins, LLP

(57) ABSTRACT

An object-based system and method of directing visual attention by a subliminal cue is disclosed. An object detector detects an object in an input image, thereby resulting in a cued object served as an object-based subliminal cue. An enhancement unit enhances saliency of the cued object in the input image by respectively and differently adjusting image characteristic of the cued object and an area other than the cued object, thereby generating a cue image. A mixer selects between the cue image and the input image, thereby resulting in a sequence of output images composed of the input images and the cue images, each of which is interposed between the adjacent input images.

6 Claims, 2 Drawing Sheets

OBJECT-BASED SYSTEM AND METHOD OF DIRECTING VISUAL ATTENTION BY A SUBLIMINAL CUE

BACKGROUND OF THE INVENTION

1. Field of the Invention

The present invention generally relates to digital image processing, and more particularly to an object-based system and method of directing visual attention by a subliminal cue.

2. Description of Related Art

Visual attention is an important characteristic of human visual system (HVS), which is a part of the central nervous system. The visual attention helps our brain to filter out excessive visual information and enables our eyes to focus on particular regions of interest.

In practice, it is necessary to direct a viewer's visual attention to a specific area, or an area of interest (AOI), in an image without letting the viewer know the intention of this action. This purpose is conventionally attained using perceivable image changes to engage viewer's awareness, for example, deliberately changing the color of a target region in an image to direct human visual attention to the target region. However, the perceivable image changes engaging viewer's awareness are not preferred for the following reasons. First the perceivable changes may lead to distractions that spoil the viewer's viewing experience. Second, the perceivable changes may cause the viewer to have a perception of the image different from the planned intention. Third, image details in the target region may be altered or lost. Moreover, the conventional method normally involves manual adjustment task and is thus not suitable for real-time applications.

For the foregoing reasons, a need has arisen to propose a novel scheme of directing viewer's visual attention in a non-intrusive and effective manner.

SUMMARY OF THE INVENTION

In view of the foregoing, it is an object of the embodiment of the present invention to provide an object-based system and method of automatically and effectively directing visual attention by a subliminal cue without engaging the viewer's awareness.

According to one embodiment, an object-based system of directing visual attention by a subliminal cue includes an object detector, an enhancement unit and a mixer. Specifically, the object detector is configured to detect an object in an input image, thereby resulting in a cued object served as an object-based subliminal cue. The enhancement unit is configured to enhance saliency of the cued object in the input image by respectively and differently adjusting image characteristic of the cued object and an area other than the cued object, thereby generating a cue image. The mixer is configured to select between the cue image and the input image, thereby resulting in a sequence of output images composed of the input images and the cue images, each of which is interposed between the adjacent input images.

DETAILED DESCRIPTION OF THE INVENTION

Figure 1:
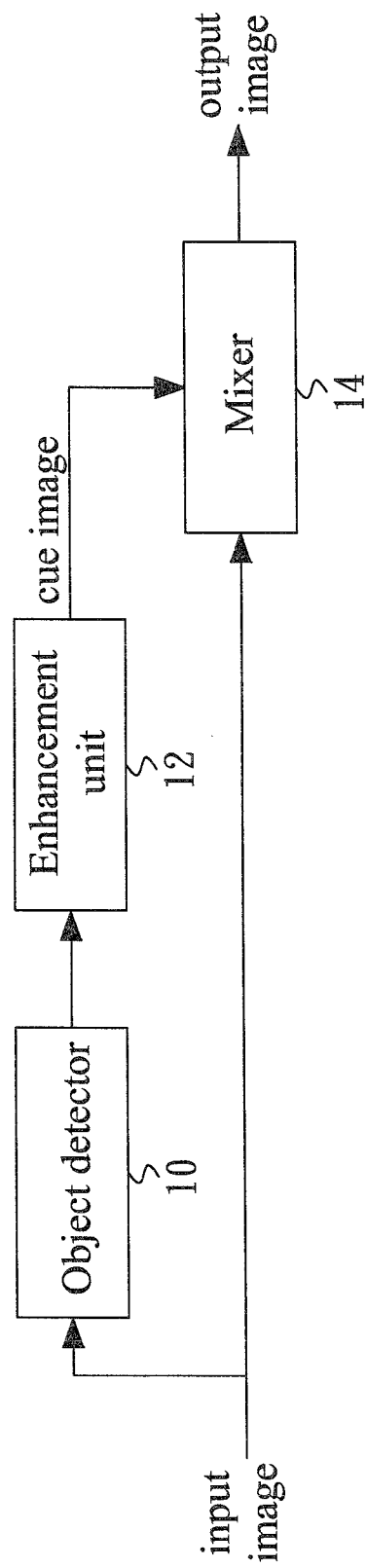
FIG. 1 shows a block diagram illustrating an object-based system and method of directing visual attention by a subliminal cue according to one embodiment of the present invention.

FIG. 1 shows a block diagram illustrating an object-based system and method of directing visual attention by a subliminal cue according to one embodiment of the present invention.

Specifically, an input image (or frame) is fed to an object detector 10. In this specification, the term "image" is defined as either a still image (e.g., a picture) or a moving image (e.g., video), and the term "image" may be interchangeably and equivalently used with "frame." Object detection (or object-class detection) is generally adopted in the object detector 10 to find in an image the location and size of an object or objects that belong to a given class. In the specific embodiment, face detection, which is a specific case of the object detection, is adopted to find the location, and usually the size as well, of a human face or faces in the image by detecting facial features using digital image processing technique. Many algorithms adaptable to detecting face have been disclosed, for example, in "Face detection using local SMQT features and split up snow classifier" (Nilsson et al., Proc. ICASSP, vol. 2, pp. 589-592, 2007), the disclosure of which is hereby incorporated herein by reference. The detected face or one of several detected faces forms an area of interest (AOI), which is then served as an object-based subliminal cue used to directing (or attracting) viewer's attention. It is noted that the subliminal cue is commonly defined as a visual stimulus that is below an individual's absolute threshold for conscious perception.

Subsequently, the detected information (i.e., the cured object or face) along with the input image outputted from the object detector 10 are both fed to an enhancement unit 12 to result in a subliminal cue image, which is generated by enhancing saliency of the cued object. In the embodiment, the luminance of the entire input image except for the cued object (e.g., the cued face) is lowered such that the luminance of the resultant cue image is lower than the luminance of the corresponding input image. Regarding the cued object in the cue image, its luminance may be maintained or even be raised. As a result, the cued object becomes more salient than other area in the cue image. It is appreciated that an image characteristic or characteristics other than luminance may be adjusted instead. In order to facilitate image processing, an area with simple geometry pattern, such as a circle or a square, corresponding to the cued object is determined and is then subjected to the required image processing.

In a specific embodiment, the luminance of the cued object is gradually attenuated from the center of the cued object toward the boundary of the cued object. For example, the center of the cued object has the highest luminance and the boundary of the cued object has the lowest luminance. Accordingly, visible edges in the boundary of the cued object may be avoided. Specifically speaking, let $(x_f, y_f)$ and $r_f$, respectively, denote the central coordinates and radius of the circle corresponding to the cued object, and let I denote the (original) input image. The process to generate a cue image C may be expressed as $$C(x,y) = I(x,y) e^{-r^2/r_f^2}, \; r^2 < f_f^2$$

$$C(x,y) = I(x,y) e^{-1}, \text{ otherwise}$$

where x and y, respectively, denote the horizontal and vertical positions of a pixel, and $r^2 = (x-x_f)^2 + (y-y_f)^2$.

Figure 2A:
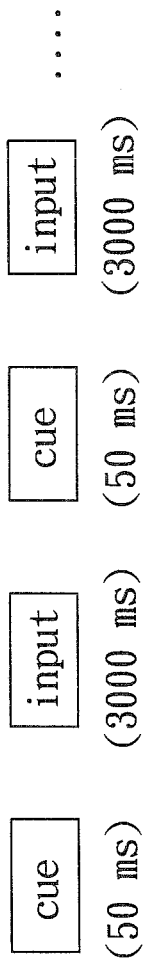
FIG. 2A and FIG. 2B show examples of alternating the cue image and the input image(s) by the mixer of FIG. 1.
Figure 2B:
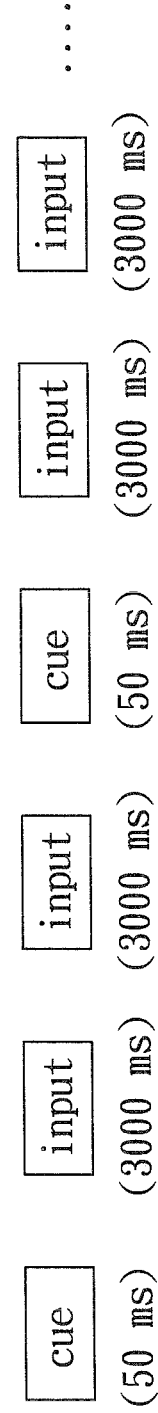

The object detector 10 and the enhancement unit 12 discussed above together form an object-based cue generation subsystem. Afterwards, the cue image from the enhancement unit 12 and the (original) input image are both fed to an image mixer (or switcher) 14 that selects between the cue image and the input image, thereby resulting in a sequence of output images composed of the input images and the cue images, each of which is interposed between the adjacent input images (or frames). For example, as shown in FIG. 2A, the mixer 14 may alternate the cue image and the input image by placing one cue image after one input image. Alternatively, as shown in FIG. 2B, the mixer 14 may alternate one cue image with two or more input images by placing one cue image after two or more input images. Moreover, each cue image may be displayed for tens or hundreds of milliseconds (ms). Generally speaking, while the input image is normally displayed according to the refresh or frame rate of a display device, the duration of displaying each cue image should be short enough such that the cue image can be unrecognizable by viewer's conscious mind, but can be perceived unconsciously (or subliminally) by the viewer.

According to the system and method of the embodiment as discussed above, a viewer's eyes will be substantially directed to the cued object in a subliminal manner. In other words, the viewer's visual attention will be directed more in the cued object than in the uncued area, and hence the cued object attracts more visual attention than the uncued area. Compared to the conventional method using perceivable image change, the object-based system and method of directing visual attention, by a subliminal cue according to the present embodiment provides a non-intrusive and bio-inspired scheme that is useful for many multimedia applications such as digital signage, advertisement media design, digital art, assistance to focusing a 3D image, and even education.

Although specific embodiments have been illustrated and described, it will be appreciated by those skilled in the art that various modifications may be made without departing from the scope of the present invention, which is intended to be limited solely by the appended claims.

What is claimed is:

1. An object-based method of directing visual attention by a subliminal cue, comprising:
   detecting an object in an input image, thereby resulting in a cued object served as an object-based subliminal cue;
   enhancing saliency of the cued object in the input image by respectively and differently adjusting an image characteristic of the cued object and an area other than the cued object, thereby generating a cue image; and
   mixing by selecting between the cue image and the input image, thereby resulting in a sequence of output images composed of the input images and the cue images, each of which is interposed between the adjacent input images; wherein the cue image C is expressed as follows:

$$C(x,y) = I(x,y)e^{-r^2/r_f^2}, \quad r^2 < r_f^2$$

$$C(x,y) = I(x,y)e^{-1} \text{ otherwise}$$

wherein I denotes the input image, x and y, respectively, denote horizontal and vertical positions of a pixel, r is defined by $r^2 = (x-x_f)^2 + (y-y_f)^2$, where $(x_f, y_f)$ and $r_f$, respectively, denote central coordinates and radius of a circle corresponding to the cued object.

2. The method of claim 1, wherein the detecting step finds a location and a size of a human face by detecting facial features using digital image processing technique.

3. The method of claim 1, wherein the enhancing step lowers luminance of the area other than the cued object.

4. The method of claim 3, wherein the enhancing step maintains or raises the luminance of the cued object.

5. The method of claim 3, wherein the enhancing step gradually attenuates the luminance of the cued object from a center of the cued object toward a boundary of the cued object.

6. The method of claim 1, wherein the mixing step alternates the cue image with the input image by placing the cue image after the input image.

* * * * *